May 29, 1956 P. CAIRD 2,747,939
FIRE HOSE NOZZLE
Filed Sept. 8, 1952 2 Sheets-Sheet 1
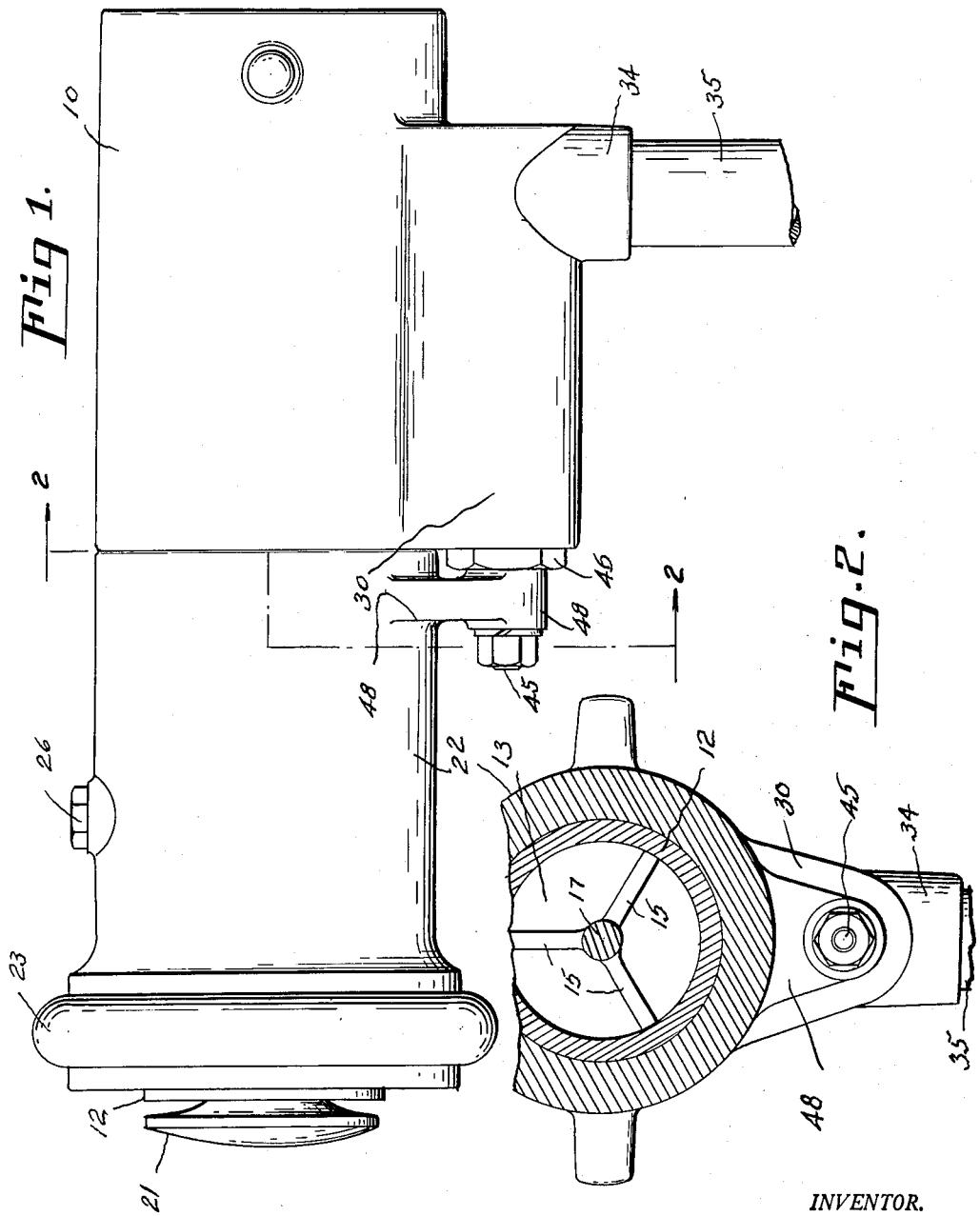
INVENTOR.
Peter Caird
BY
James C. Hamilton, Atty.

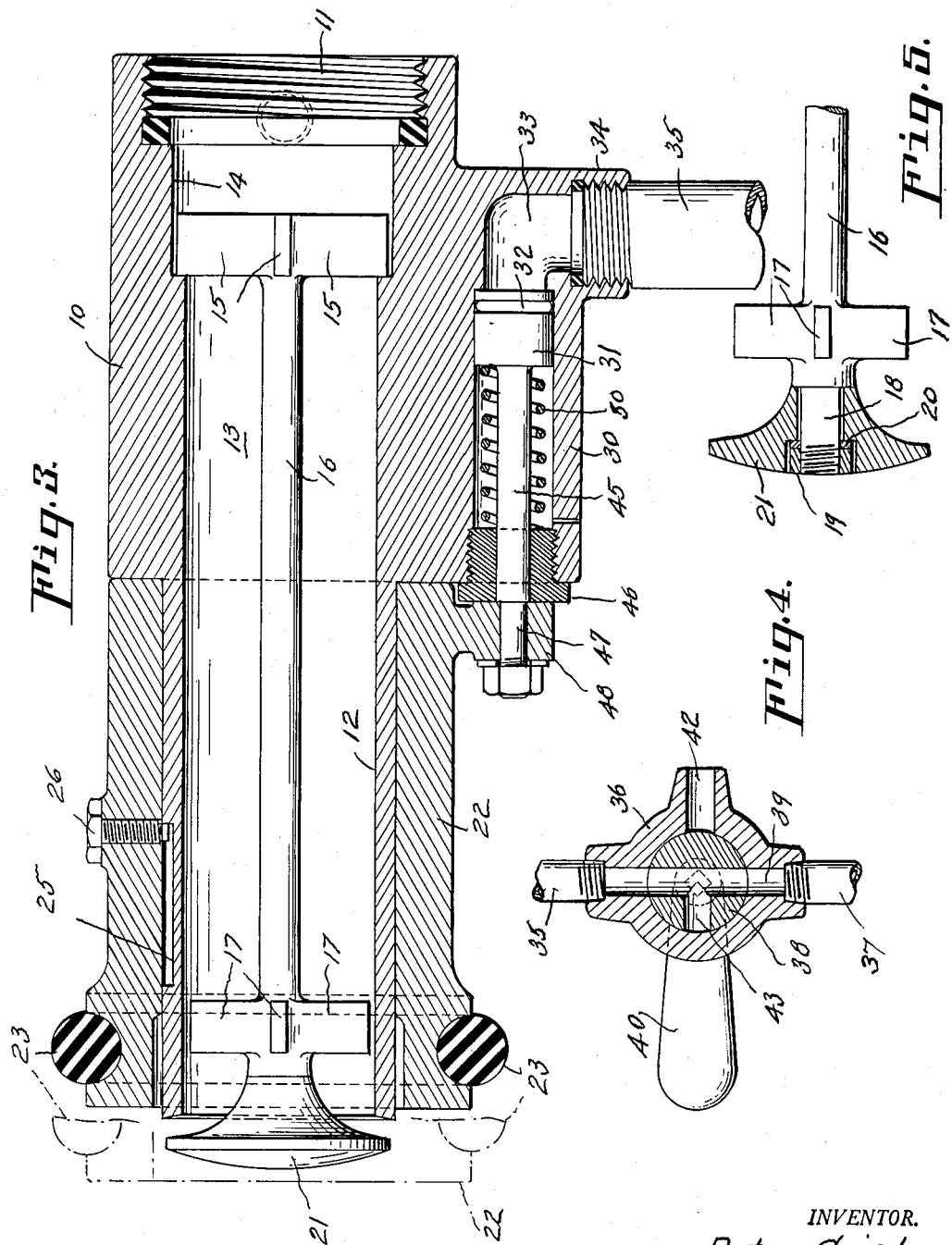

United States Patent Office 2,747,939
Patented May 29, 1956

2,747,939

FIRE HOSE NOZZLE

Peter Caird, Santa Rosa, Calif., assignor to
Clarissa E. Caird, Santa Rosa, Calif.

Application September 8, 1952, Serial No. 308,344

3 Claims. (Cl. 299—136)

My present invention relates to nozzles and more particularly to fire hose nozzles.

The principal object of my invention is to produce an improved fire hose nozzle in which the spray may be remotely controlled by hydraulic means as when the nozzle is mounted on a tower.

Another object is an improved hydraulically controlled fire hose nozzle of very simple and inexpensive construction in which is incorporated a hydraulic piston influenced in one direction by water pressure and in an opposite direction by a compression spring.

Other objects and novel features comprising the construction and operation of my invention will be more apparent as the description of the same progresses.

In the drawings illustrating the invention:

Fig. 1 is a side elevation;

Fig. 2 is a transverse cross-section, portions of which are broken away for the sake of convenience, taken on the line 2—2 of Fig. 1;

Fig. 3 is a symmetrical cross-section of the nozzle, portions of which are shown in elevation and other portions of which are broken off;

Fig. 4 is a partial cross-section and elevation of a three-way valve which controls the hydraulic pressure when the nozzle is in operation, and Fig. 5 is a fragmentary cross-section and elevation of the forward end of the spider valve stem and the free floating valve tip mounted on the extreme forward end of the said valve stem.

Referring more in detail to the drawings, 10 indicates the main body portion of the nozzle being threaded at 11 for mounting on an elevated tower or other main water supply. The forward portion of the body portion 10 is reduced in diameter to provide an extending tube portion 12. The rear end of the passage 13 formed by the base 10 and the tube 12 is recessed at 14 to receive the three legs 15 of the spider supporting the central stem 16, maintaining the stem 16 in a central position at the rear end and also preventing forward movement of the stem 16 beyond the position shown in Fig. 1. The forward end of the stem 16 is provided with another set of spider legs 17 engaging against the inner surface of the tube 12.

The valve tip mounted on the forward end of the valve stem 16, better shown in Fig. 5, is free floating being loosely journalled around the threaded end 18 of the valve stem 16 and around the nut 19 and washer 20. The washer 20 is preferably made of a fiber material so that the tip portion 21 may be freely rotated and at the same time center itself with the water column passing around it. This action permits the tip 21 to always maintain itself in the center of the stream of water so that the spray produced from the nozzle is uniform in density producing a perfect circular pattern.

On the tube 12 of the base portion 10 is slidably mounted a spray sleeve 22, the front end of which is provided with a rubber bumper ring 23. The sleeve 22 always moves in a longitudinal direction with respect to the tube 12, its limit of travel being the groove 25 in which travels the set screw 26. The groove 25 and set screw 26 also performs a second function of keeping the sleeve from being rotated.

On one side of the base portion 10 is located a cylinder body portion 30 within which is located a piston 31 on which is located a packing ring 32. Back of the piston 31 is a pressure chamber 33. Connecting the pressure chamber 33 is a boss 34 threaded to receive a pressure water supply pipe 35. The pipe 35 connects with a three-way valve 36 to the opposite side of which connects a water pressure service pipe 37. It will be apparent that when the valve center 38 is positioned as shown in Fig. 4, a direct water passage 39 connects the two pipes 35 and 37, but when the handle 40 is turned upwardly one-quarter turn, water is shut off from the pipe 37 and the pipe 35 is directly connected with the valve port 42 through the passage 43 and upper portion of passage 39 thereby dropping the pressure in the chamber 33. The piston 31 is provided with a stem portion 45 which is slidably mounted through the threaded plug member 46 in the forward end of the cylinder 30, the forward shouldered end 47 of which is bolted through a bracket member 48 depending from the sleeve 22. Around the piston stem 45 between the forward end of the piston 31 and the back end of the plug member 46 is a stiff compression spring 50, which returns the sleeve 22 and piston 31 to a normal position when the three-way valve is turned to the pressure relief position just described.

The nozzle is of the fixed flow type and by sliding the sleeve ahead on the tube 12 the spray may be varied from a circular spray to a converging solid stream of water.

While I have shown my invention somewhat in detail, yet it is to be understood that I may vary the shape and proportions within wide latitude while still remaining within the spirit of the appended claims.

Having thus described my invention, what I claim as new is:

1. An improved fire hose nozzle of the remote control type comprising a base portion having a threaded recess on the back portion to receive a main water supply, a forward tube portion attached to said base portion, a continuous water passage located through said base and tube portion, a slidable spray sleeve located around said tube portion, means for limting the movement of said sleeve portion, said spray sleeve being adjustable to vary a spray from a circular spray to a convering solid stream of water as it leaves the end of the hose nozzle, a valve stem with spider leg portions located within said continuous water passage, said legs maintaining said stem in a central position in said passage, a valve tip located on the forward end of said valve stem, means for providing transverse rotary motion of said valve tip around said valve stem, a hydraulic cylinder located in said base portion, a piston influenced by a compression spring located in said hydraulic cylinder, said piston connecting with a hydraulic head of water and having a piston stem portion extending forwardly therefrom, the extremity of said piston stem engaging with said spray sleeve thereby to move the sleeve forwardly and rearwardly and remote control means for admitting and releasing hydraulic pressure to said piston.

2. A structure as defined in claim 1 in which the base is formed at one end thereof with an extended body portion in which the hydraulic cylinder is located.

3. A structure as defined in claim 2 in which the spray sleeve is formed with a similar extension portion adapted to move into and out of abutting relationship with respect to the base extension when the hydraulic cylinder is actuated.

References Cited in the file of this patent
UNITED STATES PATENTS

| | | |
|---|---|---|
| 656,104 | Friscot | Aug. 14, 1900 |
| 1,938,511 | Brady | Dec. 5, 1933 |
| 2,174,695 | Frickie | Oct. 3, 1939 |
| 2,279,976 | Faust | Apr. 14, 1942 |
| 2,552,445 | Nielsen | May 8, 1951 |
| 2,553,401 | Carr | May 15, 1951 |
| 2,678,847 | Caird | May 18, 1954 |